(No Model.)
G. W. WILBUR.
PIPE TONGS.
No. 284,933. Patented Sept. 11, 1883.
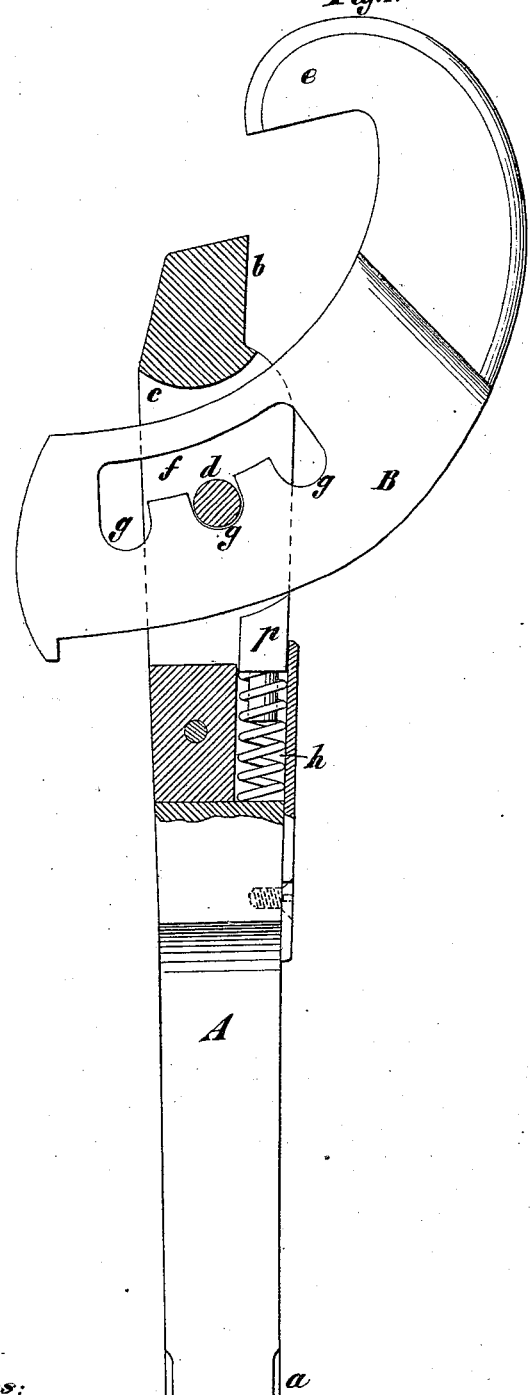
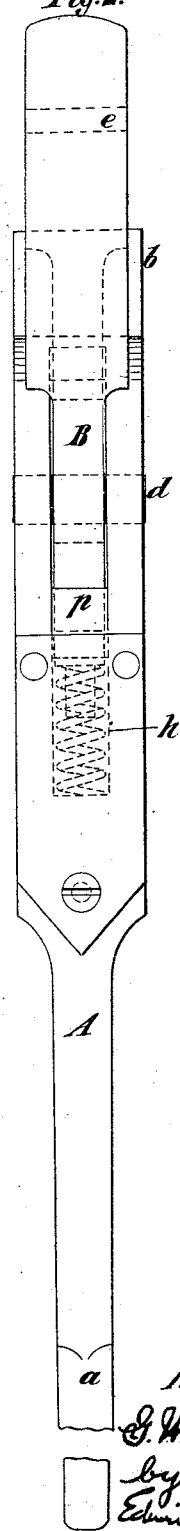
Witnesses:
James M. Bowen
Alfred L. Brown
Inventor:
G. W. Wilbur
by his atty
Edwin H. Brown

UNITED STATES PATENT OFFICE.

GEORGE W. WILBUR, OF PROVIDENCE, RHODE ISLAND, ASSIGNOR TO ATWATER E. BROCKETT, OF BRANFORD, CONNECTICUT.

PIPE-TONGS.

SPECIFICATION forming part of Letters Patent No. 284,933, dated September 11, 1883.

Application filed February 26, 1883. (No model.)

*To all whom it may concern:*

Be it known that I, GEORGE W. WILBUR, of the city and county of Providence, in the State of Rhode Island, have invented a certain new and useful Improvement in Pipe-Tongs, of which the following is a specification.

The object of my improvement is to produce pipe-tongs which will be very cheap and simple, and withal strong and durable.

To this end the improvement consists in the combination, with a main lever forming the handle of the tongs, provided with a tooth at one end and having a transversely-arranged pin or stud, of a supplementary lever provided with a tooth having a slot fitting the pin or stud of the main lever, and furnished with a series of teeth adapted to engage with the stud or pin to secure the supplementary lever in different positions relatively to the main lever.

The improvement also consists in the combination, with a main lever forming the handle of the tongs, provided with a tooth at one end and having a mortise furnished with a transverse pin or stud, of a supplementary lever fitting in the mortise of the main lever provided with a slot receiving the pin or stud of the main lever, and having a number of teeth which engage with the said pin or stud, for the purpose of securing the supplementary lever in different relations to the main lever.

The improvement also consists in the combination, with a main lever forming the handle of the tongs, provided with a tooth at one end and having a mortise furnished with a transverse pin or stud, of a supplementary lever fitting in the mortise of the main lever, provided with a slot receiving the pin or stud of the main lever, and having a number of teeth which engage with the said pin or stud, and a spring for holding the teeth in engagement with the said pin or stud.

In the accompanying drawings, Figure 1 is a sectional side view of pipe-tongs embodying the improvement, and Fig. 2 is an edge view of the same.

Similar letters of reference designate corresponding parts in both figures.

A designates the main lever of the pipe-tongs. It forms a handle, $a$, and at one end is provided with a tooth, $b$. Near the tooth $b$ this lever is provided with a mortise, $c$. A pin or stud, $d$, extends transversely across this mortise.

B designates a supplementary lever, which is provided with a tooth, $e$, and fits within the mortise $c$ of the main lever A. This supplementary lever is provided with a slot, $f$, which receives the pin or stud $d$ within it. The back of this slot $f$ is provided with a number of teeth, $g$, which may engage with the pin or stud $d$, to secure the supplementary lever in different positions. The portion of the supplementary lever which fits in the mortise $c$ is arc-shaped, so as to facilitate its adjustment in the mortise. Against the back of the supplementary lever a spring exerts its force to hold the teeth $g$ in engagement with the pin or stud $d$. This spring may be fastened to the main lever and be made to act directly upon the supplementary lever; but I prefer to make it act against a plunger, $p$, which is fitted in a cavity, $h$, and forced by the spring against the supplementary lever.

These pipe-tongs are used in the usual way by fitting their teeth $b$ $e$ on the pipe to be operated upon, and then shifting the main lever back and forth. The supplementary lever may be shifted into different positions by pressing it back, so as to disengage its teeth from the pin or stud of the main lever, then shifting it longitudinally, and subsequently allowing the spring to force it forward, so as to engage different teeth with the pin or stud.

What I claim as my invention, and desire to secure by Letters Patent, is—

1. The combination, with a main lever forming the handle of the tongs, provided with a tooth at one end and having a transversely-arranged pin or stud, of a supplementary lever provided with a tooth and having a slot fitting the pin or stud of the main lever, and furnished with a series of teeth adapted to engage with the stud or pin to secure the supplementary lever in different positions relatively to the main lever, substantially as specified.

2. The combination, with a main lever forming the handle of the tongs, provided with a tooth at one end and having a mortise furnished with a transverse pin or stud, of a supplementary lever fitting in the mortise of the main lever, provided with a slot receiving the pin or stud of the main lever, and having a number of teeth which engage with the said pin or stud, for the purpose of securing the supplementary lever in different relations to the main lever, substantially as specified.

3. The combination, with a main lever forming the handle of the tongs, provided with a tooth at one end and having a mortise furnished with a transverse pin or stud, of a supplementary lever fitting in the mortise of the main lever, provided with a slot receiving the pin or stud of the main lever, and having a number of teeth which engage with the said pin or stud, and a spring for holding the teeth in engagement with the said pin or stud, substantially as specified.

GEORGE W. WILBUR.

Witnesses:
FRANK S. ARNOLD,
HERMANN A. O'NEIL.